United States Patent
Peck

(10) Patent No.: US 8,977,916 B2
(45) Date of Patent: Mar. 10, 2015

(54) USING DATA WATCHPOINTS TO DETECT UNITIALIZED MEMORY READS

(71) Applicant: Texas Instruments Incorporated, Dallas, TX (US)

(72) Inventor: Jason L Peck, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 138 days.

(21) Appl. No.: 13/693,484

(22) Filed: Dec. 4, 2012

(65) Prior Publication Data

US 2014/0157039 A1    Jun. 5, 2014

(51) Int. Cl.
*G11C 29/00*    (2006.01)
*G06F 11/07*    (2006.01)

(52) U.S. Cl.
CPC .................................... *G06F 11/07* (2013.01)

USPC ........................... 714/719; 714/726; 714/727

(58) Field of Classification Search
CPC ....................................................... G11C 29/56
USPC ................... 714/719, 726, 727, 30, 45, 38, 2
See application file for complete search history.

(56) References Cited

U.S. PATENT DOCUMENTS 6,507,592 B1 *   1/2003   Hurvig et al. ................ 370/503
6,687,857 B1 *   2/2004   Iwata et al. ................ 714/38.13

* cited by examiner

*Primary Examiner* — Fritz Alphonse
(74) *Attorney, Agent, or Firm* — Robert D. Marshall, Jr.; Frederick J. Telecky, Jr.

(57) ABSTRACT

A method of detecting uninitialized memory reads is shown where either all or a subset of a random access memory system is initialized to a know value. One or more watch points are implemented where after a memory read is detected the value read is compared to the value written during initialization. If the values match debug information is captured and appropriate corrective action is taken.

8 Claims, 1 Drawing Sheet

START OF UMR DEBUG SESSION. ONE OR MORE ADDRESS LOCATIONS ARE IDENTIFIED AS REQUIRING UMR DETECTION → SET CONTENTS OF IDENTIFIED MEMORY LOCATIONS IN SYSTEM WITH UMR_DATA_VALUE

DURING UMR DEBUG SESSION. PREVIOUSLY ALLOCATED MEMORY HAS BEEN FREED → SET CONTENTS OF FREED MEMORY LOCATIONS IN SYSTEM WITH UMR_DATA_VALUE

USING DATA WATCHPOINTS TO DETECT UNITIALIZED MEMORY READS

TECHNICAL FIELD OF THE INVENTION

The technical field of this invention is embedded memory debug testing.

BACKGROUND OF THE INVENTION

Uninitialized memory reads (UMRs) are a common issue encountered by software programmers and often times difficult to track down. There are many situations where a UMR might be encountered, but ultimately a UMR is defined as a read from a location in memory that has not been initialized.

Some scenarios which might result in a UMR are read requests that:
 Access a memory location that has been allocated, but has not yet been initialized.
 Access locations that are beyond the end of an allocated block of memory.
 Attempt to access a location that has not yet been allocated.
 Access a location in memory that was previously allocated but subsequently freed (or reallocated and moved).
 Access a random location in memory.

An example in C of the scenario described above in "Access a memory location that has been allocated, but has not yet been initialized":

```
struct umr_test {
    int    element;
}
void main ( )
{
    struct umr_test *pinst;
    pinst = (struct umr_test *)malloc (sizeof (struct umr_test));
    printf("pinst->element = %d\n", pinst->element);
    // UMR occurs here
    return;
}
```

Typically when one thinks of how UMRs occur they think of a processor executing an instruction sequence. It is important to note that a UMR can be the result of a read request by any master in a system, including DMAs, and peripherals.

One approach in the prior art is to establish a 'watch' at various locations in memory. Once a watch is established, it is assumed that the memory locations it is monitoring are uninitialized. Subsequent accesses to the watched memory locations are monitored with a 'write' causing the associated address to be treated as initialized. If a watch detects a read access to a location that is uninitialized, then the equivalent of a UMR is triggered.

The disadvantage of this approach is the reliance on hardware tracking the state of specific memory addresses or memory regions. This can result in a large amount of extra hardware, usually on the order of 1 register per address being watched.

In another approach known in the prior art reserved/unused encodings of a memory's ECC (Error Correction Codes) are used to detect UMRs. The ECCs within a memory are initialized by Built in Self Test (BIST) logic to a state that is defined to mean 'uninitialized'. When a memory is written, the ECC will be overwritten with a setting different from the 'uninitialized' encoding. If a memory is read with an ECC value indicating that the memory has not yet been written then a breakpoint or interrupt will be generated. The disadvantage to this approach is that it is only functional with memories that support ECC.

SUMMARY OF THE INVENTION

The proposed invention uses a data watch point to monitor all read data cycles for a specific value that was set by debug tools. The value that is being watched for is pre-determined and represents uninitialized memory. This value is referred to as UMR_DATA_VALUE from here on.

At the beginning of a UMR debug session, all memory in a system will be initialized with UMR_DATA_VALUE. In systems where this is not practical, some subset of memory defined as part of a debug session as needing to detect a UMR is initialized with UMR_DATA_VALUE.

As part of program execution, whenever allocated memory is freed, the contents of that freed memory would need to be initialized with UMR_DATA_VALUE.

Data watch points need to be strategically deployed to key monitoring points in a system's bus topology. The data watch point monitors the read data cycles of the bus infrastructure that it is attached to. When the data watch point detects a match between the value observed during a read data cycle and the UMR DATA VALUE it triggers a debug sequence. During the debug sequence, information associated with the read data cycle is captured and then some action is taken

BRIEF DESCRIPTION OF THE DRAWINGS

These and other aspects of this invention are illustrated in the drawings, in which.

DETAILED DESCRIPTION OF PREFERRED EMBODIMENTS

The proposed invention uses a data watch point to monitor all read data cycles for a specific value that was set by debug tools. The value that is being watched for is pre-determined and represents uninitialized memory. This value is referred to as UMR_DATA_VALUE from here on.

Because this invention relies on a specific data value to represent uninitialized memory there is a possibility that this data watch point solution will detect a UMR at a location that happened to have been initialized with a value that matches UMR_DATA_VALUE. Statistically, with an 8-bit read transaction, this will happen 1 in 256 reads. With a 32-bit the likelihood is much less at 1 in ~4 billion.

Figure 1:
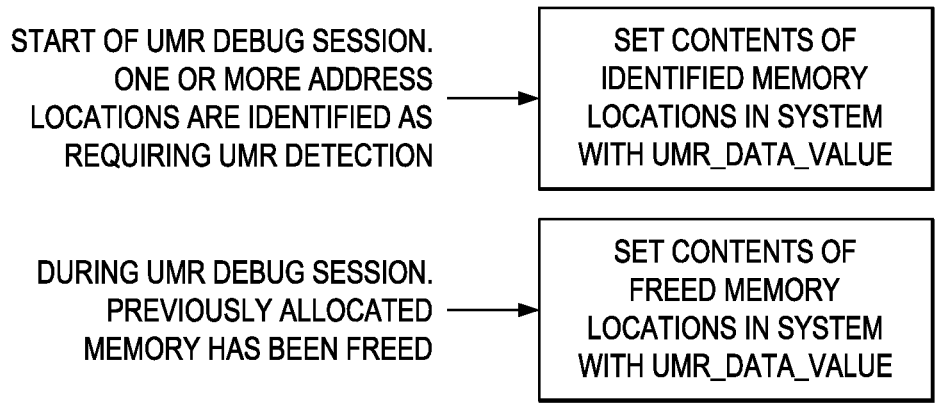
FIG. 1 illustrates the UMR initialization flow.

FIG. 1 shows the initialization of the memory at the beginning of a UMR debug session. All memory in the system will be initialized with the UMR_DATA_VALUE. In systems where this is not practical, some subset of memory defined as part of a debug session as needing to detect a UMR is initialized with UMR_DATA_VALUE.

As part of program execution, whenever allocated memory is freed, the contents of that freed memory would also need to be initialized with UMR_DATA_VALUE.

With this invention, data watch points would need to be strategically placed to key monitoring points in a system's bus topology. The data watch point monitors the read data cycles of the bus infrastructure that it is attached to. When the data watch point detects a match between the value observed during a read data cycle and the UMR_DATA_VALUE it triggers a debug sequence. During the debug sequence, information associated with the read data cycle is captured and then some action is taken.

The type of data that is captured when a debug sequence is triggered includes: read address, initiator ID, and a timestamp. Additional data which is relevant only to specific instances of a watch point might also be captured. For instance, a data watch point deployed within a DSP might include PC and a task ID.

A debug sequence is completed with a debug action that signals a UMR. The debug action that is taken depends on the context of the data watch point that triggered, or the nature of the debug session. Examples of debug actions include: halting one or more central processing units (CPUs), generating an interrupt to a processor, and generating a trace message.

Many systems support multiple sizes for read transactions with different alignments. It is desirable in such systems to use a UMR_DATA_VALUE where every byte-lane is identical. For instance, in a system that needs to support 8-bit, 16-bit, 32-bit, and 64-bit data reads, UMR_DATA_VALUE could be CCCC_CCCC_CCCC_CCCCh.

Figure 2:
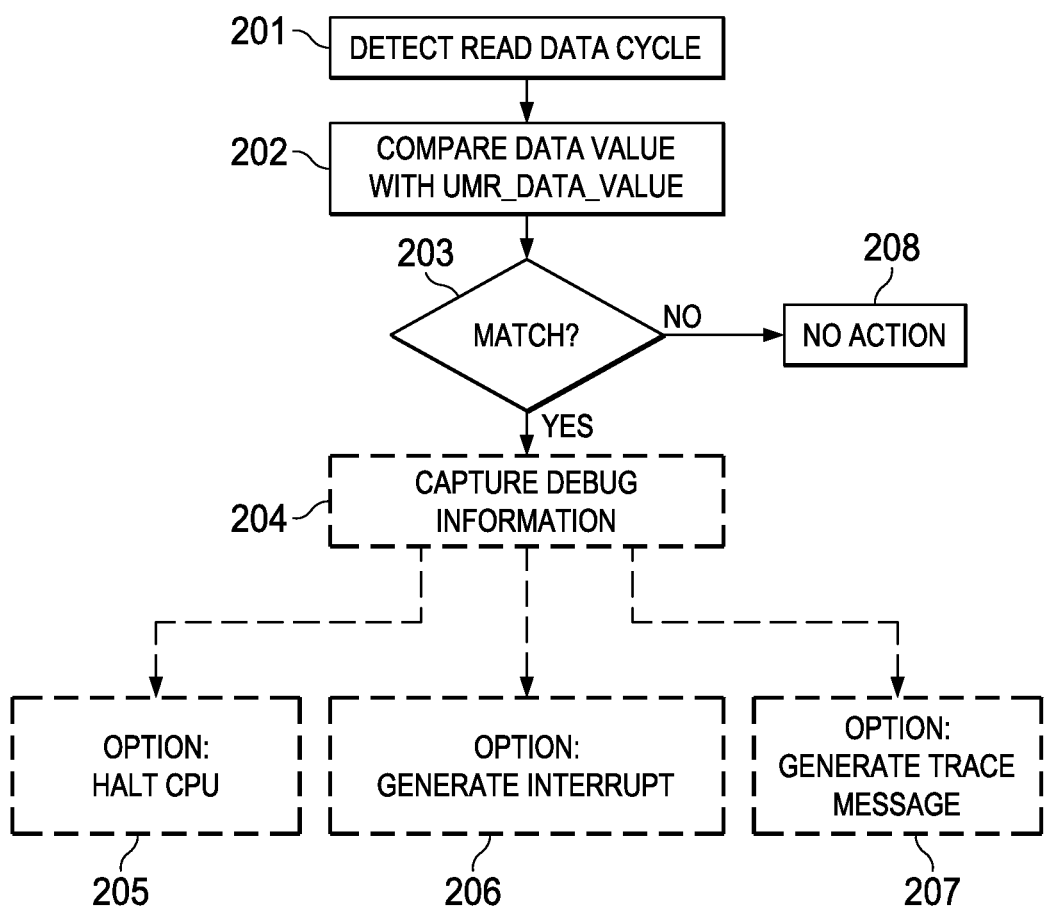
FIG. 2 illustrates the UMR Watch Point flow.

FIG. 2 shows a flow chart of the UMR watch point operation. UMR logic 201 detects a memory read data cycle, and in 202 compares the data value with the UMR_DATA_VALUE. A possible match is detected in 203. If there is no match, there is no action needs to be taken in 208. In case of a match debug information is captured in 204, and selected action is taken in blocks 205, 206 or 207.

What is claimed is:

1. A method of detecting central processing unit (CPU) memory read requests from an uninitialized location in a random access memory system comprising the steps of:
    writing a predetermined data value into each memory location of the random access memory system under test;
    detecting each data read request operation from the random access memory system;
    comparing the data read during the memory read operation to the predetermined data value previously written into all locations of the random access memory system under test;
    capturing debug information if the data read during the read operation matches the predetermined data value previously written into all locations of the random access memory system under test;
    taking corrective action if the data read during the read operation matches the predetermined data value previously written into all locations of the random access memory system under test.

2. The method of claim 1 wherein:
said step of writing the predetermined data value writes into only a subset of the random access memory system under test.

3. The method of claim 1 wherein:
said step of taking corrective action includes halting one or more CPUs.

4. The method of claim 1 wherein:
said step of taking corrective action includes generating an interrupt.

5. The method of claim 1 wherein:
said step of taking corrective action includes generating a trace message.

6. The method of claim 1 wherein:
said step of capturing debug information includes capturing a read address, an ID of an initiator, and a timestamp.

7. The method of claim 1 wherein:
said step of capturing debug information includes capturing a program counter and a relevant task ID.

8. The method of claim 1, further comprising the step of:
writing the predetermined data value into each location of the random access memory under test that is freed during program execution.

* * * * *